US008281770B2

(12) United States Patent
Huang

(10) Patent No.: US 8,281,770 B2
(45) Date of Patent: Oct. 9, 2012

(54) CATALYTIC FUEL OIL ECONOMIZER IN OIL LINES OF MOTOR VEHICLE

(75) Inventor: Shlyan Huang, Beijing (CN)

(73) Assignee: Ngreen Residental Environment Technology Development (Beijing) Limited, Beijing (CN)

( * ) Notice: Subject to any disclaimer, the term of this patent is extended or adjusted under 35 U.S.C. 154(b) by 994 days.

(21) Appl. No.: 12/226,770

(22) PCT Filed: Apr. 13, 2007

(86) PCT No.: PCT/CN2007/001223
§ 371 (c)(1),
(2), (4) Date: Oct. 27, 2008

(87) PCT Pub. No.: WO2007/128200
PCT Pub. Date: Nov. 15, 2007

(65) Prior Publication Data
US 2009/0126655 A1    May 21, 2009

(30) Foreign Application Priority Data
Apr. 26, 2006 (CN) .......................... 2006 1 0075978

(51) Int. Cl.
*F02M 31/125* (2006.01)
(52) U.S. Cl. ........................................ 123/536; 123/537
(58) Field of Classification Search .................. 123/2, 3, 123/536–538
See application file for complete search history.

(56) References Cited

U.S. PATENT DOCUMENTS
4,046,522 A * 9/1977 Chen et al. .................. 48/102 A
(Continued)

FOREIGN PATENT DOCUMENTS
CN    19650362 A1    10/1997
(Continued)

OTHER PUBLICATIONS
International Search Report for PCT Appln. No. PCT/CN2007/001223 dated Jul. 19, 2007.

*Primary Examiner* — M. McMahon
(74) *Attorney, Agent, or Firm* — Robert P. Michal; Lucas & Mercanti, LLP

(57) ABSTRACT

The present invention discloses Aa vehicle oil-way catalytic fuel economizer which includes a catalyzing device, a heating box enveloping the catalyzing device, electric heating temperature controlling parts, return oil amount regulating parts and a return pipeline for economizing fuel oil. The catalyzing device includes a metal box, catalyzing stack sealed in the metal box, inlet and outlet joint communicating with the gaps of the catalyzing stack. The oil inlet is connected with the outlet of the pumping oil pipe, and the oil outlet is connected with main flown pipeline of the engine. The return pipeline for economizing fuel oil is connected between the inlet of the catalyzing device and original return pipeline of the vehicle engine. The present invention heats a catalytic stack using by the electricity of a vehicle storage battery. The fuel can converse a gas with a plurality of small molecules by the effect of accelerant and heat energy as the fuel through the gap of the catalytic stack, and then entrances into an engine cylinder and burns. The catalytic fuel economizer not only can burn the fuel completely and improve the heat efficiency of the engine, but also can decline the oil wear of electrical-spray vehicle in 100 kilometers of 40%-42% and decline the oil wear of carburetor vehicle in 100 kilometers of 48%-52%, and also takes off the contaminant in exhaust gas of the vehicle.

14 Claims, 1 Drawing Sheet

U.S. PATENT DOCUMENTS

| | | | |
|---|---|---|---|
| 4,147,136 A * | 4/1979 | Noguchi et al. | 123/3 |
| 4,303,051 A * | 12/1981 | Weishaar | 123/557 |
| 4,499,863 A * | 2/1985 | Gandhi et al. | 123/3 |
| 4,716,859 A * | 1/1988 | Konig et al. | 123/3 |
| 4,774,152 A * | 9/1988 | Matsumura et al. | 429/424 |
| 5,207,203 A * | 5/1993 | Wagner et al. | 123/514 |
| 5,219,399 A * | 6/1993 | Brana | 123/557 |
| 6,213,104 B1 * | 4/2001 | Ishikiriyama et al. | 123/557 |
| 6,314,919 B1 * | 11/2001 | Pugachev | 123/3 |
| 6,911,187 B2 * | 6/2005 | Maruko | 422/209 |
| 7,066,156 B2 * | 6/2006 | Magyari | 123/538 |
| 7,572,164 B2 * | 8/2009 | Takeda et al. | 445/46 |
| 7,797,928 B2 * | 9/2010 | Friedrich et al. | 60/284 |
| 8,017,088 B2 * | 9/2011 | Lee et al. | 422/177 |
| 2002/0168308 A1 * | 11/2002 | Loffler et al. | 422/211 |
| 2003/0049184 A1 * | 3/2003 | Kimata et al. | 422/188 |
| 2004/0237303 A1 * | 12/2004 | Maude | 29/890 |
| 2007/0190377 A1 * | 8/2007 | Elwart et al. | 429/22 |

FOREIGN PATENT DOCUMENTS

| | | |
|---|---|---|
| CN | 1170083 A | 1/1998 |
| CN | 2340905 Y | 9/1999 |
| CN | 2597684 Y | 1/2004 |
| CN | 1614221 A | 5/2005 |
| CN | 2763552 Y | 3/2006 |
| JP | 2004084548 A | 3/2004 |

* cited by examiner

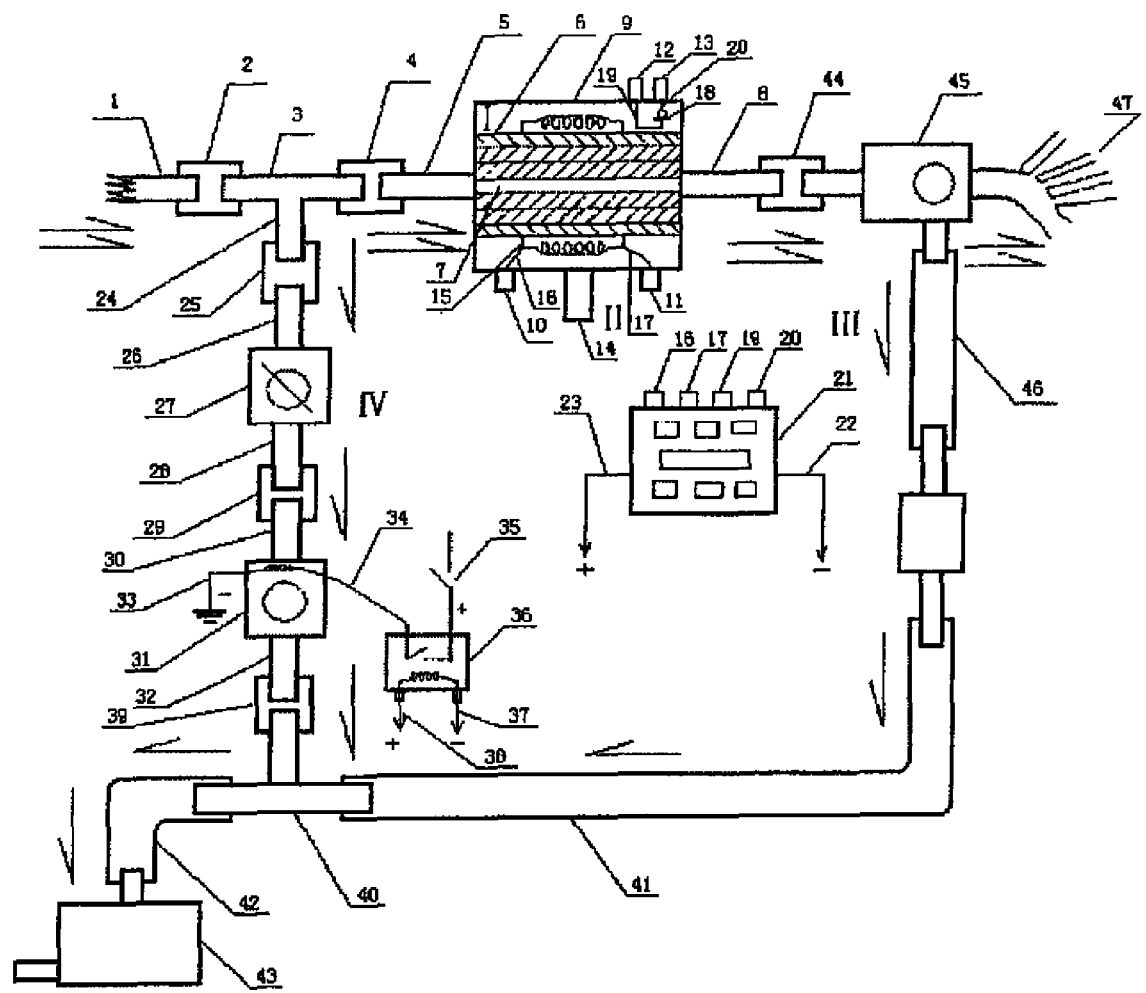

US 8,281,770 B2

CATALYTIC FUEL OIL ECONOMIZER IN OIL LINES OF MOTOR VEHICLE

This application is a U.S. National Phase Application under 35 USC 371 of International Application PCT/CN2007/001223 filed Apr. 13, 2007.

TECHNICAL FIELD

The present invention relates to a catalytic fuel economizer for vehicle oil-way systems.

BACKGROUND ART

Electrical-spray vehicle has lower oil wear and lower exhaust gas emission than carburetor vehicle. But the oil wear of electrical-spray vehicle is very large, its average value of effective thermal efficiency is only 26%, exhaust pollutant does not satisfy the uprising requirements of environment protect standard. For improving effective thermal efficiency and reducing the exhaust pollutant emissions, Pat No. ZL96106780.2, issued Jul. 10, 1996, discloses a method and apparatus that make fuel of gas engine of carburetor denatured burned, however which have the following disadvantages: Firstly, using the recovered tail gas and cooling water to heat catalytic stack can't maintain a constant temperature, that result in the amount of catalytic stack is unstable fission and further result in the rotate speed of internal combustion engine is unstable; Secondly, as the front of catalytic stack has not set return oil loop, it's difficult to adjust the proportion of mix gas within internal-combustion engine appropriately; Thirdly, the apparatus's structure is complex and can not used with electrical-spray vehicle and diesel oil carburetor cooperatively.

CONTENTS OF THE INVENTION

(1) The Technical Problem to be Solved

The present invention want to provide a vehicle oil-way catalytic fuel economizer, it does not charge any vehicle structure and only make hose and connecter connected with oil-way of engine of electrical-spray vehicle or carburetor, both show the rate of fuel saving reaches up to 35.1% 40 to 50%.

(2) Technical Solution

The vehicle oil-way catalytic fuel economizer according to the present invention comprises four parts: catalytic stack, heat box, electric-heating temperature-control components and return oil loop conditioning components. The entrances of this catalytic stack is communicated aperture of catalytic stack metal box sealed, the entrances of fuel economizer is also entrances of catalytic stack, which connect carburetor engine of major fuel input pipe, the end of catalytic fuel reactor economizer connect mid-joint of catalytic stack import connect of tee, the other end connects mid-joint of connector of engine oil loop pipe of tee to form return oil loop of catalytic economizer, it uses power supply heat catalytic reactor and temperature-controlled instrument to maintain a constant temperature of the selected control points, using flow-control valve to ensure the appropriate amount of return-fuel, the fuel must flow through gap of catalytic stack in catalytic reactor before it put into the cylinder, the fuel is convertered gas-fired under condition of the catalyst and heat energy, then emit from entrances of catalytic reactor to mixed with air and burns when it enter the cylinder.

According to the above vehicle oil-way catalytic fuel economizer, wherein the catalytic reactor include the catalytic stack, the metal box, input joint, output joint. The catalytic stack is sealed in the metal box, the input joint and output joint both connected with the fuel economizer.

According to the above vehicle oil-way catalytic fuel economizer, the catalytic stack is made by several superimposed catalytic chips. There are 30 μm~180 μm gaps between these chips.

According to the above vehicle oil-way catalytic fuel economizer, wherein the catalytic chips has: carrier made from sintering $SiO_2$ or SiC or $Al_2O_3$, than coating near nanometer serum powder of Ru+Pd+Ag, or coating carrier with the near nanometer serum powder of $CuO+MnO_2+Au$, then sintering the carrier.

According to the above vehicle oil-way catalytic fuel economizer, wherein the heat box include metal or nonmetal shell, the wiring terminal and air valve on the shell, the heat box are fixed with the economizer. The heat box is full of oil medium. The heat box can be united with the economizer; also they can be made separately. The heat box surround the economizer all along.

According to the above vehicle oil-way catalytic fuel economizer, wherein the electrical heating temperature-control system include: electrical heating component, insulator-bracket, temperature-sensing element, temperature controller and wires. The electrical heating component is fixed on the insulatorbracket, the electrical heating component and temperature-sensing element are fixed in the heating box close to outer wall of the economizer, the two wires of temperature-sensing element and electrical heating component are connected with the four wiring terminal outside of the heating box, then connect the wiring terminal with the heating junction of temperature-control unit, also with the junction of temperature-sensing element. The temperature-control unit has two wires, the "−" wire connected with the shell of the engine, the "+" wire connected with switch of the vehicle.

According to the above vehicle oil-way catalytic fuel economizer, wherein the temperature-control point is range from 50° C. to 200° C. commonly.

According to the above vehicle oil-way catalytic fuel economizer, wherein oil loop conditioning components including flow-control valves, electromagnetic valve, relays, conduit, through joint, tee joint and wire, input joint of flow-control valve connects mid-connectors of input joint-tee of catalytic reactor by hose, output joint of flow-control valve connects input joint of electromagnetic valve, output joint of electromagnetic valve connects mid-joint of tee joint of engine return oil loop, forms return oil loop of catalytic fuel economizer between input of catalytic reactor and catalytic economizer, one wire of electromagnetic valve connects shell of engine, the other one connect normal open terminal of relay, then connects work switch of vehicle, when vehicle working, electromagnetic valve is open, redundant fuel flow to the return oil loop of engine from input joint of oil pipe of catalytic reactor then flow fuel tank, a wire of relay loop connect shell of engine, the other one connect work switch of engine, when vehicle starting, the relay produce electromagnetic, then relay normal-open terminal spring is attracted so then make normal-open terminal breaking or opening, at one time break electromagnetic valve such that blocking the return oil-loop of catalytic economizer. When vehicle working, key is back work to location of engine, relay is turnoff, and the spring is back to normal-open location, electromagnetic valve form electrical circuit and pull up valve, thereby make the catalytic fuel economizer forming pathway, then controlling flow control valve and appropriate return oil.

According to the above vehicle oil-way catalytic fuel economizer, which is most suitable for fuel vehicle.

(3) Advantageous Effects

The vehicle oil-way catalytic fuel economizer according to the present invention, which has the following merit and the positive effects: After connect oil-way vehicle catalytic fuel economizer to oil-way of vehicle, when vehicle working, circuit of heating element inside heating box is turnon, the temperature inside heating box raise continuously, temperature sensor inside heated box transmit information to temperature-control unit by wire, when it raise indication temperature of temperature-control unit, temperature-control unit sending instructions, electrical circuit of the heating element is breaked immediately and stop heating, when temperature is dropped, temperature-control unit immediately sending instruction to switch on electrical circuit of heating element and beginning to heat, so repeatedly to make temperature is stabilized; the heat inside heated box is transmit to catalytic stack through metal shell of catalytic reactor, at the moment, temperature controller control temperature of catalytic reactor, fuel of inside gap of catalytic stack absorbs heat energy ceaselessly, when catalyst's activation energy can achieve fuel-dehydrogenation or decomposition-dehydrogenation or decomposition, the fuel inside gaps of catalytic stack is degenerated to micromolecular fuel gas instead of atomization fuel, so that it can improve the burn efficiency of the fuel, micromolecular fuel gas can mixes with oxygen and burns completely.

DESCRIPTION OF FIGURES

FIG. 1 shows the construction and connection mode of a vehicle oil-way catalytic fuel economizer according to the invention.

UTILITY MODE

Hereinafter the utility mode of the vehicle oil-way catalytic fuel economizer according to the present invention will be described in detail with reference to the accompanying drawing, which is not intended to define the scope of the invention.

In a vehicle oil-way catalytic fuel economizer according to the present invention as shown in The FIGURE, the oil flowing direction is signed with arrow in the manner that the double-arrow indicative of oil inlet flowing direction and the single-arrow indicative of oil return flowing direction. A vehicle oil-way catalytic fuel economizer consists of four parts: catalytic reactor I, heating box II, electrical heating control element III, return oil loop conditioning components IV; the catalytic reactor I consists of: metal box 6, sealed catalytic stack 7, oil inlet joint 5 and oil outlet joint 8 connected with the catalytic reactor gap; wherein catalytic reactor 7 is made by several superimposed catalytic chips and there are 3 μm~180 μm gaps between these chips. The preferred catalytic chips made in a manner that sintering the sintered piece of $SiO_2O$ or SiC or $Al_2O_3$ as a carrier coated with powder slurry which pestle into near nanometer from compounding of Ru+Pd+Ag or $CuO+MnO_2+Au$, of course, the catalytic chips could be catalytic chips having any other known construction or component.

The heating box II consists of: metal or nonmetal shell 9 surrounding the outer wall of the catalytic stacks, electrical heating unit wiring terminal 10, 11, temperature-sensing element wiring terminal 12, 13 and air vent valve 14 on the shell wall; the electrical heating temperature controlling part III consists of: electrical heating unit 15, wire 16, 17 of the electrical heating element, temperature-sensing element 18, wire 19, 20 of the temperature-sensing element and temperature controller unit 21. "−" wire 22 of the temperature controlling unit connected to the shell of the vehicle and connected with the vehicle storage battery, "+" wire 23 connected to the vehicle operation switch and then connected to the "+" pole of the vehicle storage battery; the return oil loop adjusting part IV consists of: flow control valve 27, oil inlet joint 26 and oil outlet joint 28 of the flow control valve, electromagnetic valve 31, oil inlet joint 30 and oil outlet joint 32 of the electromagnetic valve, wires 33, 34 of the electromagnetic valve, relay 36, wires 37, 38 of the relay, closed-open wires 34, 35 of the relay; the flowing direction of oil inlet way: oil inlet joint 5 of the catalytic reactor is connected to the outlet joint of tee 3 of the oil pump outlet with hose 4, the other outlet joint of three-way pipe 3 is connected to outlet joint 1 of the oil pump pipe with hose 2, outlet joint 8 of the catalytic reactor is connected to the chief oil outlet pipe 45 of the vehicle engine with hose 44, outlet of chief oil outlet pipe 45 of the vehicle engine is connected to a plurality of branch cylinder inlet joints 47, so that the oil can flowing into the gap of the catalytic reactor 7 through 1, 2, 3, 4, 5 and into the original outlet path of the vehicle engine from oil outlet joint 8 of catalytic reactor after flowing in circles around the gap and then enter into each cylinder for burning; the flowing direction of return oil loop: inlet joint 26 of flow control valve 27 is connected to mid-joint 24 of oil inlet tee with hose 25 and connected with the oil inlet of the catalytic reactor, outlet joint 28 of the flow control valve is connected to magnetic valve inlet joint 30 with hose 29, outlet joint 32 of the flow control valve is connected to the mid-joint of tee 40 of the middle piece of the original oil return pipe of the vehicle engine with hose 39, wherein 41, 42, 46 are the original return oil loop of the vehicle and the flowing direction of the return oil loop shows in FIG. 1 indicated with single-arrow.

Example 1

The invention is fixed in a carburetor vehicle in the manner of connecting inlet tee 3 to the oil pump outlet hose, connecting outlet 8 of the catalytic fuel economizer to the inlet joint of the carburetor float chamber, connecting electromagnetic valve outlet 32 into the middle joint which located at the middle joint of tee of return oil loop of the engine and then wire 33 of the magnetic valve, wire 37 of the relay and wire 22 of the temperature controller unit onto the shell of the engine, the other wire 35 of the electromagnetic valve and wire 23 of the temperature controller unit onto the vehicle operating switch, the other wire 38 of the relay onto the vehicle starting switch. While the vehicle start working, the catalytic fuel economizer of the invention do the same. The invention has trial fixed in carburetor vehicles such as Jetta, Santana, Hongqi and can decline the oil wear of carburetor vehicle in 100 kilometers of 48%-52%.

Example 2

The invention is fixed in an electrical-spray vehicle in the manner of connecting inlet tee 3 to chief oil outlet pipe of the oil pump of electrical-spray vehicle, connecting outlet joint 8 to the end joint of the chief oil outlet pipe with hose 44, connecting outlet pipe 32 of return oil loop into the middle joint located at middle piece of tee of return oil loop of the engine with hose 39, and then connecting wire 33 of the electromagnetic valve, wire 37 of the relay and wire 22 of the temperature controller unit onto the shell of the engine, the other wire 35 of the electromagnetic valve, wire 23 of the temperature controller unit into the vehicle operating switch and the other wire 38 of the relay onto the vehicle starting switch. While the vehicle start working, the catalytic fuel economizer of the invention do the same. The invention has trial fixed in electrical-spray vehicles such as Jetta, Santana, Hongqi and can decline the oil wear of electrical-spray vehicle in 100 kilometers of 40%-42%.

It has described the best modes of the present invention above, and the similar and substitute solutions apparently to those skilled in the art should be parts in the scope of the present invention.

INDUSTRIAL APPLICABILITY

Vehicle oil-way catalytic fuel economizer of the invention can be used in carburetor vehicles, electrical-spray vehicles or diesel oil vehicles. when the Vehicle oil-way catalytic fuel economizer of the invention is connected in oil way of the vehicles, the catalytic stack in the catalytic reactor is heated by the electricity of a vehicle storage battery. The fuel can converse a gas into a plurality of small molecules by the effects of accelerant and heat energy as the fuel through the gap of the catalytic stack, and then entrances into an engine cylinder and burns. The catalytic fuel economizer not only can burn the fuel completely and improve the heat efficiency of the engine, but also can decline the oil wear of electrical-spray vehicle in 100 kilometers of 40%-42% and decline the oil wear of carburetor vehicle in 100 kilometers of 48%-52%, and also takes off the contaminant in exhaust gas of the vehicle.

The invention claimed is:

1. A vehicle oil-way catalytic fuel economizer comprising: a catalytic reactor, a heating box enveloping the catalytic reactor, an electrical heating temperature control unit, return oil regulating components and an oil-efficient return pipeline, wherein the catalytic reactor comprises a metal box, a catalytic stack sealed in the metal box, an inlet joint and an outlet joint, both the inlet joint and the outlet joint being connected with the catalytic stack; an oil inlet of the catalytic reactor is connected with an outlet of an oil pumping pipe, and an oil outlet of the catalytic reactor is connected with a manifold oil outlet pipeline of the vehicle engine; said oil-efficient return pipeline is connected at a location between an inlet of the catalytic reactor and an original return pipeline of the vehicle engine; the return oil regulating components are disposed on the oil-efficient return pipeline to ensure a suitable flow; said electric heating temperature control unit is a temperature controller used for ensuring stability of a selected temperature-control point; the heating box uses vehicle power for heating, and wherein said return oil regulating components include a flow control valve, an electromagnetic valve, a relay, a conduit, a through joint, a tee joint and wires; an inlet of the flow control valve is connected with the inlet of the catalytic reactor, an outlet of the flow control valve is connected with an inlet of the electromagnetic valve, and an outlet of the electromagnetic valve is connected with the original return pipelines of the vehicle engine, thus an oil-efficient return path is formed between the inlet of the catalytic reactor and the return pipelines of the vehicle engine; one wire of the electromagnetic valve is connected with a shell of the vehicle engine, and the other wire is connected to a normal open terminal of the relay and then to a starting switch of the vehicle; when the vehicle is started, the electromagnetic valve is opened, excessive fuel flows to the return pipelines of the vehicle engine from the inlet of the catalytic reactor and then flows to a fuel tank; one wire of a coil of the relay is connected with the shell of the vehicle engine, and the other wire is connected with a starting switch of the vehicle engine; when the vehicle is started, the relay produces electromagnetism after energization which attracts a spring piece at the normal open terminal of the relay, makes a short out or a circuit break at the normal open terminal, and closes the electromagnetic valve, so that the oil-efficient return pipeline of the catalytic fuel economizer is blocked; when the vehicle is working, a key of the vehicle returns to a working location of the vehicle engine, the relay is cut off, and the spring piece returns to a normal-open location, so that the electromagnetic valve forms an electric-loop which pulls the valve up so as to make the catalytic fuel economizer closed, and then the flow control valve is adjusted for appropriate return oil amount.

2. The vehicle oil-way catalytic fuel economizer according to claim 1, wherein:
the heating box comprises a shell, wiring terminals disposed on the shell and an air vent valve, the heating box being insulated from the catalytic reactor and filled with oil medium, the heating box and the catalytic reactor are formed to be integrated or in a split type.

3. The vehicle oil-way catalytic fuel economizer according to claim 1, wherein:
said heating temperature control unit comprises an electrical heating component, an insulator bracket, a temperature-sensing element, a temperature controller and wires, wherein the electrical heating component is fixed on the insulator bracket, both the electrical heating component and the temperature-sensing element are put into the heating box near the exterior wall of the catalytic reactor; in the heating box two pair of wires of the electrical heating component and of the temperature-sensing element are connected with the four wiring terminals respectively, which are disposed outside the heating box, and then, heating junctions of the temperature controller and junctions of the temperature-sensing element are connected with the wiring terminals by using wires, the temperature controller having two wires, of which a first marked with "−" is connected with a shell of the vehicle engine, and the second of which is marked with "+" is connected with a switch of the vehicle.

4. The vehicle oil-way catalytic fuel economizer according to claim 1, wherein:
said catalytic stack is formed by several superimposed catalytic chips and there are gaps of 30 μm~180 μm among these chips.

5. The vehicle oil-way catalytic fuel economizer according to claim 4, wherein:
said catalytic chip is formed as follows: taking a sintering piece of $SiO_2$ or SiC or $Al_2O_3$ as a carrier, coating the sintering piece with near-nanometer sized grinding powder composed of Ru, Pd and Ag, or coating the sintering piece with near-nanometer sized grinding powder composed of CuO, $MnO_2$ and Au, then sintering the carrier.

6. The vehicle oil-way catalytic fuel economizer according to claim 5, wherein:
the temperature of said temperature-control point in the heating box ranges from 50° C. to 200° C.

7. The vehicle oil-way catalytic fuel economizer according to claim 4, wherein:
the temperature of said temperature-control point in the heating box ranges from 50° C. to 200° C.

8. The vehicle oil-way catalytic fuel economizer according to claim 1, wherein:
the temperature of said temperature-control point in the heating box ranges from 50° C. to 200° C.

9. The vehicle oil-way catalytic fuel economizer according to claim 3, wherein:
the temperature of said temperature-control point in the heating box ranges from 50° C. to 200° C.

10. The vehicle oil-way catalytic fuel economizer according to claim 2, wherein:
the temperature of said temperature-control point in the heating box ranges from 50° C. to 200° C.

11. The vehicle oil-way catalytic fuel economizer according to claim 1, wherein:
the temperature of said temperature-control point in the heating box ranges from 50° C. to 200° C.

12. A vehicle oil-way catalytic fuel economizer comprising:
a catalytic reactor, a heating box enveloping the catalytic reactor, an electrical heating temperature control unit, return oil regulating components and an oil-efficient return pipeline, wherein the catalytic reactor comprises a metal box, a catalytic stack sealed in the metal box, an inlet joint and an outlet joint, both the inlet joint and the outlet joint being connected with the catalytic stack; an oil inlet of the catalytic reactor is connected with an outlet of an oil pumping pipe, and an oil outlet of the catalytic reactor is connected with a manifold oil outlet pipeline of the vehicle engine; said oil-efficient return pipeline is connected at a location between an inlet of the catalytic reactor and an original return pipeline of the vehicle engine; the return oil regulating components are disposed on the oil-efficient return pipeline to ensure a suitable flow; said electric heating temperature control unit is a temperature controller used for ensuring stability of a selected temperature-control point; the heating box uses vehicle power for heating, and
wherein said catalytic stack is formed by several superimposed catalytic chips and there are gaps of 30 μm~180 μm among these chips.

13. The vehicle oil-way catalytic fuel economizer according to claim 12, wherein:
said catalytic chip is formed as follows: taking a sintering piece of SiO2 or SiC or Al2O3 as a carrier, coating the sintering piece with near-nanometer sized grinding powder composed of Ru, Pd and Ag, or coating the sintering piece with near-nanometer sized grinding powder composed of CuO, $MnO_2$ and Au, then sintering the carrier.

14. The vehicle oil-way catalytic fuel economizer according to claim 13, wherein:
the temperature of said temperature-control point in the heating box ranges from 50° C. to 200° C.

* * * * *

UNITED STATES PATENT AND TRADEMARK OFFICE
CERTIFICATE OF CORRECTION

PATENT NO. : 8,281,770 B2  
APPLICATION NO. : 12/226770  
DATED : October 9, 2012  
INVENTOR(S) : Shiyan Huang It is certified that error appears in the above-identified patent and that said Letters Patent is hereby corrected as shown below:

Title Page

Item 75 Inventor: "Shlyan Huang" should read --Shiyan Huang--.

Item 73 Assignee: "Ngreen Residental Environment Technology Development (Beijing) Limited, Beijing (CN)" should read --Ngreen Residential Environment Technology Development (Beijing) Limited, Beijing (CN)--.

Signed and Sealed this  
Twenty-sixth Day of February, 2013

Teresa Stanek Rea  
*Acting Director of the United States Patent and Trademark Office*